United States Patent [19]
Simonsen et al.

[11] 3,945,263
[45] Mar. 23, 1976

[54] CONNECTION FOR THE ENDS OF STRENGTH CARRIERS IN CONVEYOR BELTS

[75] Inventors: Harald Simonsen, Ludersen; Jürgen Bräutigam, Hannover, both of Germany

[73] Assignee: Continental Gummi-Werke Aktiengesellschaft, Hannover, Germany

[22] Filed: Sept. 6, 1974

[21] Appl. No.: 503,708

[30] Foreign Application Priority Data
Sept. 8, 1973  Germany ..................... 2345414

[52] U.S. Cl. ................................. 74/231 J; 74/237
[51] Int. Cl.² ...................... G01F 1/06; G01F 3/34
[58] Field of Search ....... 74/231 J, 258, 237, 231 R; 403/268

[56] References Cited
UNITED STATES PATENTS

| | | | |
|---|---|---|---|
| 3,076,736 | 2/1963 | McHugh | 74/231 J |
| 3,245,276 | 4/1966 | Wall | 74/237 X |
| 3,507,949 | 4/1970 | Campbell | 403/268 X |
| 3,693,218 | 9/1972 | Jaubert | 74/231 J X |
| 3,786,554 | 1/1974 | Little | 403/268 X |
| 3,839,766 | 10/1974 | Kenney | 74/231 J X |

*Primary Examiner*—Leonard H. Gerin
*Attorney, Agent, or Firm*—Walter Becker

[57] ABSTRACT

A connection for the ends of strength carriers in conveyor belts of synthetic material or rubber. The ends of the strength carriers in the form of strands or cables are inserted or clamped into casings or sleeves which are connected to each other in pairs in the manner of a hinge with a sleeve section containing the end of a cable.

14 Claims, 4 Drawing Figures

CONNECTION FOR THE ENDS OF STRENGTH CARRIERS IN CONVEYOR BELTS

The present invention relates to connections for conveyor belts of rubber or synthetic material which belts have wire strands or similar filaments or cord-like strength carrying members embedded lengthwise therein while being spaced from each other in transverse direction of the belt.

Heretofore, the so-called steel cable conveyor belt could only be made continuous by using a cohesion between the elastomeric material of the belt body and the metallic strength carrying members. This is so because, as a result of the exclusively lengthwise orientation of the course of the wire strands, it is not possible to insert hooks or other connecting means. Aside from the quality of the compound and its shear strength and the strand distribution, the strength of the connection is, therefore, primarily dependent upon the quality and durability of the adhering rubber-metal connection. The exacting requirements presuppose accurate execution of the connections and make the use of first class experts essential. In such an instance, the consumption not only of time, but also the cost can be significant. The great length of the connections is frequently a drawback, because placing the abutting strands next to each other in an overlapping arrangement, necessarily results in a localized stiffening of the belt. On the other hand, with regard to the desired material to material connection, the belt must be of at least a minimum length. Finally, it is also occasionally desired to have a detachable connection of the belt ends. This, however, is not possible with the heretofore known connections which depend upon the cohesion between two different materials.

It is an object of the present invention not only to be able to quickly and easily make continuous steel cable or other stranded conveyor belts, but to also provide a detachable connection of the belt ends.

These and other objects and advantages of the invention will appear more clearly from the following specification in connection with the accompanying drawing, in which.

The conveyor belt connection according to the present invention is characterized primarily in that connecting elements known per se are inserted in a novel construction and arrangement so that the ends of the wire strands which face one another are in the axial direction elastically or plastically yieldably inserted into rigid casings or sleeves which in pairs are either plastically yieldably hinged or rigidly connected together.

The ends of adjacent wire strands may be offset in the longitudinal direction of the conveyor belt in order to prevent the casings or sleeves from touching one another. The inside of the sleeves expediently have at least a partial clearance from the inserted strands. The gap thus formed is filled with an elastic or plastic deformable material. To this end, the sleeves may, for instance, have an inner wall conically widening in the direction toward the free end of the wire strand, or also, may be provided with depressions or recesses which are distributed over the periphery of the inside of the sleeves and extend in an essentially axial direction along this length.

Figure 1:
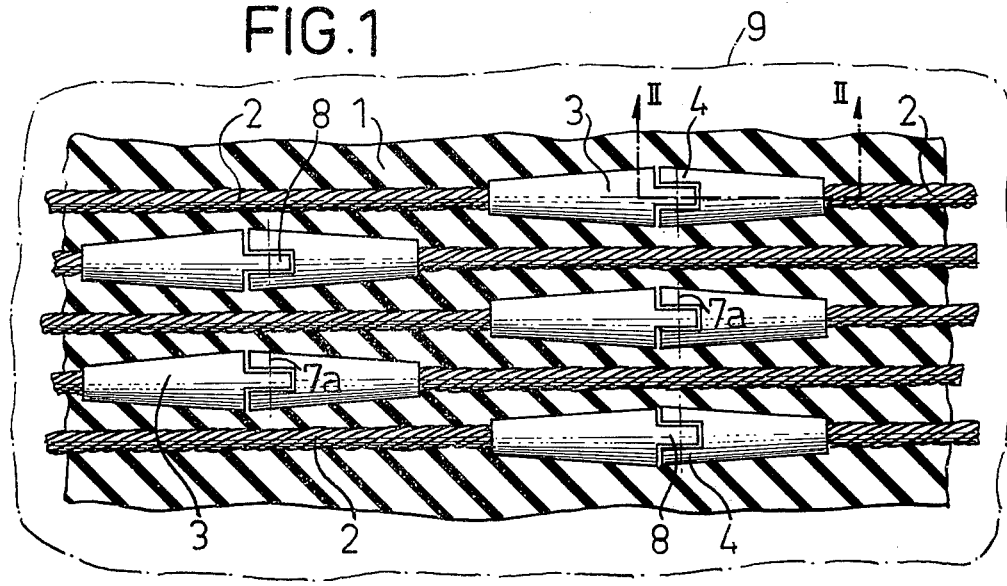
FIG. 1 is a partial top view of a single-stage conveyor belt according to the invention in which the top or cover plate indicated by dot-dash lines is removed.
Figure 2:
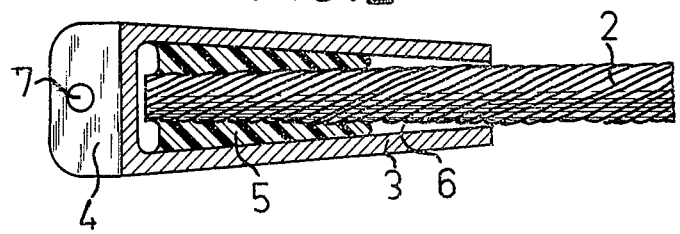
FIG. 2 is an enlarged longitudinal section of a portion of the belt shown in FIG. 1, said section being taken along the line II—II of FIG. 1.
Figure 3:
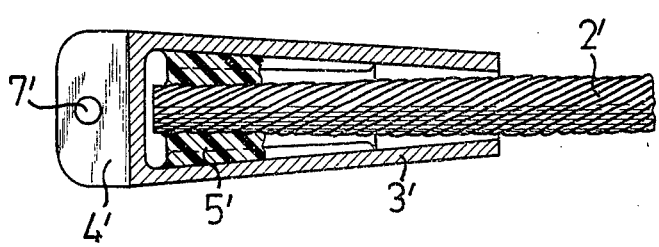
FIG. 3 is a section similar to that of FIG. 2, and illustrates a modification thereof.
Figure 4:
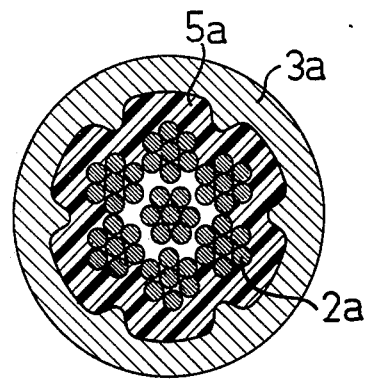
FIG. 4 is a cross section through still another embodiment of the invention.

Referring now to the drawing in detail, the arrangement shown therein comprises a conveyor belt 1 which has a plurality of steel cables or strands 2 which are adjacent to and spaced from one another and which are embedded in the core rubber layer. The strands 2, which are approximately, or practically parallel to the side edges of the belt run the entire length of the belt and, in the connection area, are butt-jointed in pairs. Steel casings or sleeves 3 are placed or forced upon the ends of the strands or cables 2. The sleeves 3 are tapered and are provided with linkage ears 4. The annulus formed between the strands and the inside of the casings 3 is filled with a plastic or elastically deformable filler 5, for example, a synthetic resin plastic, while sufficient free space 6 is left to permit the deformation of the belt. Though not shown, by inserting joint pins or bolts where the dot-dash lines are shown in FIG. 1 into the bores 7 of the respective interfitting ears or plates 4,8 of the associated sleeves 3, a pull-resistant connection of the strands or cables 2 with each other is established.

The thus prepared connection area may subsequently be covered with a cover layer 8 and may be finish-vulcanized.

The present invention provides a novel connection for steel cable conveyor belts which does away with the use of the heretofore prevalent material to material force transfer between the strength carrying members and thus avoids the frequently experienced disadvantageous dependence upon the quality of the elastomeric belt components and, as an indirect result of its design, opens up various advantageous possibilities. The hinged connection of the sleeves, which surround the ends of the strands or cables, with one another by mechanical means allows to maintain a breaking strength in the area of the connection of an order of magnitude of the pull strength of the strand or cable. Already, the yieldable clamping-in of the cable ends within the rigid sleeves will when establishing the connection, bring about a desired compensation of the tension differences between the individual wire strands or cables over the width of the conveyor belts. The yieldable clamping of the cable ends within the rigid sleeves additionally acts as a shock absorber when using the completed conveyor belt and, consequently reduces the wear of the mechanical connecting parts. Even though the preparation of the wire strands requires a certain amount of time, the actual establishment of the connection is still comparatively fast when normal techniques are used within the limitation of average precision requirements. An especially important advantage is the ability to restrict the connection point or area to a very short section of the belt. In practice, no more than twice the length of the sleeve is needed, so that accordingly, the bending ability of the belt is only negligibly affected. Moreover, the preferred flexible connection of the abutting sleeves aids the flexibility of the conveyor belt and the adaptability of the latter to deviating and driving drums having an extremely small diameter.

With the practical design of the sleeves or casings and the fastening means associated therewith, it is possible to make the connection detachable. The selection may vary depending upon the predominant operating conditions and the type of conveyor belt. A certain restriction is, of course, present from the start because of the spacing of the strands. More clearance or free space may be obtained if the strands or cables are staggered or offset lengthwise to each other in appropriate progression.

It is, of course, to be understood that the present invention is, by no means, limited to the specific showing of the drawing, but also comprises any modifications within the scope of the appended claims.

It may be further mentioned that while the plastically or elastically deformable filling mass 6 may be of any suitable material, a thermosetting epoxy resin has been found particularly suitable for this purpose.

What we claim is:

1. An endless conveyor belt having metal cable connection, which includes in combination: strength carrier means embedded in said conveyor belt and having two ends arranged in spaced alignment to and facing each other, and first and second sleeve means respectively yieldably holding said aligned ends therein, said first and second sleeve means with said aligned ends held completely surrounded therein being connected to each other.

2. A conveyor belt in combination according to claim 1, in which said strength carrier means comprise a plurality of substantially parallel strength carriers extending in the longitudinal direction of said conveyor belt and spaced from each other in the direction transverse to the longitudinal direction of said conveyor belt, each of said strength carriers having two axially aligned and spaced ends and two rigid axially aligned sleeve means having the respective pertaining strength carrier ends yieldably held therein, each two axially aligned sleeve means of one and the same strength carrier being connected to each other.

3. A conveyor belt in combination according to claim 2, in which each two axially aligned sleeve means of one and the same strength carrier are hingedly connected to each other.

4. A conveyor belt in combination according to claim 1, in which said aligned ends of said strength carriers are elastically yieldably arranged in the pertaining sleeve means.

5. A conveyor belt in combination according to claim 1, in which said aligned ends of said strength carriers are plastically yieldably arranged in the pertaining sleeve means.

6. A conveyor belt in combination according to claim 2, in which the ends of one strength carrier are offset relative to the ends of an adjacent strength carrier in the longitudinal direction of said conveyor belt.

7. A conveyor belt in combination according to claim 1, in which the inside surface of said sleeve means is at least partially spaced from the strength carrier ends held in the pertaining sleeve means, and which includes elastically deformable material filling in at least some of the space between said sleeve means and the strength carrier end portion therein.

8. A conveyor belt in combination according to claim 1, in which the inside surface of said sleeve means is at least partially spaced from the strength carrier ends held into the pertaining sleeve means, and which includes plastically deformable material filling in at least some of the space between said sleeve means and the strength carrier end portions therein.

9. A conveyor belt in combination according to claim 7, in which said elastically deformable material is bonded to the adjacent strength carrier and the adjacent sleeve means.

10. A conveyor belt in combination according to claim 8, in which said plastically deformable material is bonded to the adjacent sleeve means and the adjacent strength carrier.

11. A conveyor belt in combination according to claim 1, which includes deformable rubber material between portions of the two axially aligned ends of said strength carriers and the pertaining sleeve means.

12. A conveyor belt in combination according to claim 1, in which the inner wall surface of each of said sleeve means tapers conically so as to converge in the direction away from the very end of the respective pertaining strength carrier held therein.

13. A conveyor belt in combination according to claim 1, in which each of said sleeve means has its inner wall surface provided with recess means extending in the longitudinal direction of said sleeve means, said recess means being distributed over said inner wall surface.

14. A conveyor belt in combination according to claim 1, in which said first and second sleeve means pertaining to one and the same strength carrier means are detachably connected to each other.

* * * * *